(12) United States Patent
Icart

(10) Patent No.: US 9,866,371 B2
(45) Date of Patent: *Jan. 9, 2018

(54) CRYPTOGRAPHY ON A SIMPLIFIED ELLIPTICAL CURVE

(71) Applicant: MORPHO, Paris (FR)

(72) Inventor: Thomas Icart, Paris (FR)

(73) Assignee: MORPHO, Paris (FR)

( * ) Notice: Subject to any disclaimer, the term of this patent is extended or adjusted under 35 U.S.C. 154(b) by 33 days.

This patent is subject to a terminal disclaimer.

(21) Appl. No.: 15/178,478

(22) Filed: Jun. 9, 2016

(65) Prior Publication Data

US 2017/0214527 A1  Jul. 27, 2017

Related U.S. Application Data

(63) Continuation of application No. 14/261,845, filed on Apr. 25, 2014, which is a continuation of application No. 13/377,381, filed as application No. PCT/FR2010/051191 on Jun. 15, 2010, now Pat. No. 8,712,038.

(30) Foreign Application Priority Data

Jun. 16, 2009 (FR) ...................................... 09 54043

(51) Int. Cl.
*H04L 9/00* (2006.01)
*H04L 9/30* (2006.01)

(52) U.S. Cl.
CPC .............. *H04L 9/005* (2013.01); *H04L 9/002* (2013.01); *H04L 9/30* (2013.01); *H04L 9/3066* (2013.01)

(58) Field of Classification Search
CPC ....... H04L 9/3066; H04L 9/002; H04L 9/005; H04L 9/30; G06F 7/724; G06F 7/725
See application file for complete search history.

(56) References Cited

U.S. PATENT DOCUMENTS

| | | | | |
|---|---|---|---|---|
| 6,876,745 B1 * | 4/2005 | Kurumatani | ............ | G06F 7/725 380/28 |
| 7,079,650 B1 * | 7/2006 | Knudsen | ................. | G06F 7/725 380/28 |

(Continued)

FOREIGN PATENT DOCUMENTS

WO    WO-0005837    2/2000

OTHER PUBLICATIONS

Shallue et al., Construction of Rational Points on Elliptic Curves over Finite Fields, 2006, Springer-Verlag, LNCS 4076, pp. 510-524.*

(Continued)

*Primary Examiner* — Khang Do
(74) *Attorney, Agent, or Firm* — Blakely Sokoloff Taylor & Zafman LLP

(57) ABSTRACT

A cryptographic calculation includes obtaining a point P(X, Y) from a parameter t on an elliptical curve $Y^2=f(X)$ and from polynomials satisfying: $-f(X_1(t)) \cdot f(X_2(t))=U(t)^2$ in the finite body Fq, irrespective of the parameter t, q=3 mod 4. A value of the parameter t is obtained and the point P is determined by: (i) calculating $X_1=X_1(t)$, $X_2=X_2(t)$ and $U=U(t)$; (ii) testing whether the term $f(X-1)$ is a squared term in the finite body Fq and, if so, calculating the square root of the term f(X1), the point P having $X_1$ as abscissa and $Y_1$, the square root of the term $f(X_1)$, as ordinate; (iii) otherwise, calculating the square root of the term $f(X_2)$, the point P having $X_2$, as abscissa and $Y_2$, the square root of the term $f(X_2)$, as ordinate. The point P is useful in encryption, scrambling, signature, authentication or identification cryptographic applications.

6 Claims, 4 Drawing Sheets

(56) References Cited

U.S. PATENT DOCUMENTS

| | | | |
|---|---|---|---|
| 8,225,109 | B1 | 7/2012 | Kalligudd |
| 2001/0002486 | A1 | 5/2001 | Kocher et al. |
| 2002/0101987 | A1* | 8/2002 | Koc ................ G06F 7/725 380/44 |
| 2003/0059042 | A1 | 3/2003 | Okeya et al. |
| 2004/0039911 | A1* | 2/2004 | Oka ................ G06Q 30/06 713/175 |
| 2004/0252834 | A1 | 12/2004 | Nishimura et al. |
| 2006/0239459 | A1* | 10/2006 | Yamamichi .......... H04L 9/3093 380/255 |
| 2007/0121933 | A1* | 5/2007 | Futa ................ H04L 9/3066 380/1 |
| 2008/0170695 | A1 | 7/2008 | Adler et al. |
| 2010/0293379 | A1 | 11/2010 | Nie |

OTHER PUBLICATIONS

International Search Report and Written Opinion with English Language Translation, dated Jan. 17, 2011, Application No. PCT/FR2010/051191.

Shallue, Andrew, et al., "Construction of Rational Points on Elliptic Curves over Finite Fields", *Algorithmic Number Theory*. 7th International Symposium, ANTS-VII Proceedings (Lecture Notes in Computer Science vol. 4076), (2006), 510-524.

Ulas, Maciej, "Rational Points on Certain Hyperelliptic Curves Over Finite Fields", *Mathematics Subject Classification*, Primary 11D25, 11D41; Secondary 14G15, (2000), 1-9.

\* cited by examiner

CRYPTOGRAPHY ON A SIMPLIFIED ELLIPTICAL CURVE

PRIORITY CLAIM

This application is a continuation-in-part of U.S. patent application Ser. No. 14/261,845 filed Apr. 25, 2014, which is a continuation of U.S. patent application Ser. No. 13/377,381 filed Dec. 9, 2011, which is a 371 filing from PCT/FR2010/051191 (published as WO 2010/146303) filed Jun. 15, 2010 which claims the benefit of French Application for Patent No. 09-54043 filed Jun. 16, 2009, the disclosures of which are hereby incorporated by reference.

TECHNICAL FIELD

The present invention relates to message cryptography based on the use of points on an elliptical curve, and more particularly said cryptography of a deterministic nature.

BACKGROUND

In order to apply a cryptographic calculation to a message, conventionally algorithms are employed for inserting arbitrary values into mathematical structures. For this purpose, the elliptical curves are mathematical structures that are able to facilitate the application of such cryptographic calculations and at the same time save space in memory relative to the use of other cryptographic calculations.

However, efficient algorithms for inserting arbitrary values using elliptical curves are probabilistic. Consequently, the application time of these algorithms is not constant, it depends on the message to be encoded. Thus, if an attacker determines different application times of the algorithm applied, he can obtain information about the coded message.

In order to mask the time taken by a probabilistic insertion algorithm, it is possible to provide the addition of unnecessary steps in this algorithm so that its application always extends over a period of time of identical length, regardless of the message processed.

A point P of an elliptical curve is defined by its abscissa X and its ordinate Y, X and Y satisfying the following equation:

$$f(X)=Y^2 \quad (1)$$

where f(X) is the polynomial $f(X)=X^3+aX+b$

A family of polynomials is known, which satisfy Skalba's equality which makes it possible to determine such a point on an elliptical curve, as defined in the document 'Construction of Rational Points on Elliptic curves over finite fields' by Andrew Shallue and Christiaan van de Woestijne.

Polynomials $X_1(t)$, $X_2(t)$, $X_3(t)$ and $U(t)$ satisfy Skalba's equality if they satisfy the following equation:

$$f(X_1(t)) \cdot f(X_2(t)) \cdot f(X_3(t)) = U^2(t) \quad (2)$$

where f is the function that defines the elliptical curve under consideration, and
where t is a parameter.

The polynomials that satisfy Skalba's equality can take two parameters u and t. In this case, Skalba's equality is written:

$$f(X_1(t,u)) \cdot f(X_2(t,u)) \cdot f(X_3(t,u)) = U^2(t,u)$$

Equations of this type can be used with two parameters u and t. However, in the proposed applications, we can advantageously envisage setting u, or alternatively setting t, at any value. Thus, the value of a single parameter remains to be chosen.

Given selected parameters t and u, it is noted that $X_1=X_1(t,u)$, $X_2=X_2(t,u)$, $X_3=X_3(t,u)$, $U=U(t,u)$, where $X_1$, $X_2$, $X_3$ and U are elements of $F_q$. This equation (2) signifies that at least one of the values $f(X_1)$, $f(X_2)$ and $f(X_3)$ corresponds to a squared term in the finite field $F_q$.

Then, once the squared term in $F_q$, $f(X_i)$, is identified, we can then obtain a point on the elliptical curve $P(X_i, \sqrt{f(X_i)})$ Calculation of $\sqrt{f(X_i)}$ can be performed by means of an exponentiation calculation when the characteristic q of the field Fq satisfies:

$$q=3 \bmod 4$$

In this case, it is known that:

$$\sqrt{f(X_i)} = f(X_i)^{(q+1)/4} \quad (3)$$

In order to determine a point on the elliptical curve (1), it is therefore necessary to determine which value among the three values $f(X_1)$, $f(X_2)$ and $f(X_3)$ corresponds to a squared term in the finite field $F_q$. For this purpose we could envisage checking firstly whether the term $f(X_1)$ is a squared term in the finite field $F_q$, then, if it is not the case, apply this same check to the term $f(X_2)$, and finally if this is still not so, check the term $f(X_3)$ similarly. However, following this procedure, determination of a point on the elliptical curve does not always take the same time, since this determination is executed more quickly if the first term tested is a squared term than if only the third term is a squared term.

A potential attacker could make use of this difference in elapsed time to determine a point on the elliptical curve for breaking the secret linked to the parameter that enabled this point to be generated. Now, in the field of cryptography, these parameters must remain secret.

These parameters can in particular correspond to passwords. Thus, it is important that determination of these points does not in itself supply information that makes it possible to break the secret of the parameter, and accordingly, attacks based on an analysis of the elapsed time for determining a point on the curve are to be avoided.

To overcome this disadvantage, it would be possible to check the three terms $f(X_i)$ systematically for i in the range from 1 to 3. Thus, the time for determining a point on the curve would no longer be a function of the point determined.

However, checking whether a term of equation (2) is a squared term in the finite field $F_q$ is a complex operation in particular employing an exponentiation, which is costly in execution time. In the case when we wish to determine a point on an elliptical curve on the basis of Skalba's equalities, while performing these determinations in a constant time, four operations of exponentiation are required in the case described above, one exponentiation per check of each of the terms of Skalba's equation (2) and one exponentiation for calculating the square root, as described in equation (3).

The present invention aims to improve this situation.

SUMMARY

A first aspect of the present invention proposes a method of execution of a cryptographic calculation in an electronic component (As used herein, "electronic component" is defined as a general purpose or dedicated computer programmed to execute instructions which perform the cryptographic calculation described in detail below comprising a step of obtaining a point P(X,Y) starting from at least one parameter t, on an elliptical curve satisfying the equation:

$$Y^2=f(X); \text{ and}$$

starting from polynomials $X_1(t)$, $X_2(t)$, and $U(t)$ satisfying the following equality:

$$f(X_1(t)) \cdot f(X_2(t)) = U(t)^2$$

in the finite field $F_q$, regardless of the parameter t, q satisfying the equation q=3 mod 4;

said method comprising the following steps:
/1/ obtain a value of the parameter t;
/2/ determine point P by executing the following substeps:
/i/ calculate $X_1=X_1(t)$, $X_2=X_2(t)$, and $U=U(t)$
/ii/ test whether the term $f(X_1)$ is a squared term in the finite field $F_q$ and in this case, calculate the square root of the term $f(X_1)$, point P having $X_1$ as abscissa and the square root of the term $f(X_1)$ as ordinate;
/iii/ otherwise, calculate the square root of the term $f(X_2)$, point P having $X_2$ as abscissa and the square root of the term $f(X_2)$ as ordinate;
/3/ use said point P in a cryptographic application of encryption or hashing or signature or authentication or identification.

It should be noted here that the determination of a point on an elliptical curve is carried out on the basis of an advantageous equation:

$$-f(X_1) \cdot f(X_2) = U^2 \quad (4)$$

This equation follows from the Skalba equality (2). In fact, this equation can be obtained by setting:

$$f(X_3) = -1$$

Now, in the finite field $F_q$ with q=3 mod 4, −1 is not a squared term. Consequently, only two terms of the equation (4) still remain to be checked in order to decide which of the two terms corresponds to a squared term in $F_q$.

Thanks to these arrangements, it is possible to determine a point on an elliptical curve in a manner suitable for use in the field of cryptography, since on the one hand this determination takes the same time regardless of the input parameter t and on the other hand it is efficient as the number of demanding operations is reduced.

This determination takes a constant time that does not depend on the input parameter or parameters. In fact, even if this method offers different processing options depending on the term that corresponds to a squared term in Skalba's equality, the same number of operations of the same type is performed regardless of the point on the curve that is determined. More precisely, regardless of the point on the curve that is determined, the following list of operations is executed:

test for a squared term in $F_q$;
determination of a square root.

Therefore it is not possible to launch an attack of the 'timing attack' type. Moreover, this determination is efficient since the number of costly operations employed is limited. In fact, thanks to equation (4) only two terms instead of three in the equation (2) are to be checked in order to determine whether they correspond to the squared terms in the finite field $F_q$ by applying a maximum of two exponentiation-type operations.

This embodiment is general and can easily be applied to any family of polynomials satisfying equality (4).

In one embodiment of the present invention, it is provided at step /2/-/ii/, to carry out the following steps
calculate $R_1$ such that:

$$R_1 = (f(X_1) \cdot f(X_2))^{\frac{q+1}{4}}$$

if $R_1^2$ is equal to 1,
decide that the term $f(X_1)$ is a squared term in the field $F_q$, and
calculate $$Y_1 = f(X_1)^{\frac{q+1}{4}}$$

otherwise calculate $$Y_2 = f(X_2)^{\frac{q+1}{4}}$$

Here, only two exponentiations are carried out, whatever the processing option applied.

In another embodiment, it is also possible to reduce the number of exponentiations, which are the most demanding operations to carry out in this method. In fact, at step /2/-/ii/, the following steps can be carried out:
calculate $R_1'$ such that:

$$R_1' = f(X_1)^{q-1-\frac{q+1}{4}}$$

calculate $R_2'$ such that:

$$R_2' = R_1'^2$$

calculate $R_3'$ such that:

$$R_3' = R_2' \cdot f(X_1)$$

if $R_3'$ is not equal to 1, at step /2/-/iii/, the square root of $f(X_2)$ is obtained according to the following equation:

$$\sqrt{f(X_2)} = R_0 \cdot R_1'$$

where $R_0$ satisfies the following equation:

$$R_0 = U(t) \cdot (-1)^{q-1-\frac{q+1}{4}}$$

It should be noted here that, advantageously, one exponentiation is carried out in this case during execution of a method according to one embodiment of the present invention.

In fact, ingenious use is made of the fact that we can finally recover the square root of $f(X_2)$ in the case where the term $f(X_2)$ corresponds to a squared term, without however implementing an additional exponentiation. In fact, the square root of f(X2) obtained by:

$$\sqrt{f(X_2)} = R_0 \cdot R_1'$$

where the term $R_0$ is finally obtained by a multiplication operation which is less demanding than the application of an exponentiation. Moreover, only the term U(t) is to be calculated in this embodiment, as the term $$(-1)^{q-1-\frac{q+1}{4}}$$

is an immediate calculation term. Therefore it is in no way useful to pre-calculate this last term and store it in memory. Thus memory space can be saved.

Then, if $R_3$ is equal to 1, then at step /2/-/iii/ the square root of $f(X_1)$ can be obtained according to the following equation:

$$\sqrt{f(X_1)} = R'_3 \cdot f(X_1)$$

This also corresponds to a multiplication.

During execution of such calculations according to one embodiment of the present invention, the time taken for carrying out the operations other than an exponentiation is negligible relative to the time taken by the application of an exponentiation. Now, owing to the characteristics of the present invention, instead of four exponentiations, as described previously in a conventional case, two exponentiations are required at most. Such a reduction in the number of exponentiations is very advantageous.

In one embodiment of the present invention, the polynomials satisfying equation (4) according to one embodiment of the present invention in X and Y are expressed in Jacobian coordinates in X', Y' and Z such that:

$$X' = X \cdot Z^2$$

$$Y' = Y \cdot Z^3$$

and the operations of inversion are transformed into operations of multiplication.

The transformation into Jacobian coordinates makes it possible to transform the inversions into multiplications, when the term Z is correctly selected.

In one embodiment of the present invention, the polynomials are expressed in Jacobian coordinates, according to which the point P(X,Y) is written P(X',Y',Z) such that:

$$X' = X \cdot Z^2.$$

$$Y' = Y \cdot Z^3$$

where the function f is written f z (X') and satisfies:

$$f_z(X') = X'^3 + a \cdot X' \cdot Z^4 + b \cdot Z^6$$

with the elliptical curve satisfying the equation:

$$y'^2 = f_z(X')$$

in which the polynomials expressed in Jacobian coordinates are $X'_1(t)$, $X'_2(t)$, $X'_3(t)$, $Z(t)$ and $U'(t)$ and satisfy the following equality in Jacobian coordinates:

$$U'(t)^2 = -f_{z(t)}(X'_1(t)) \cdot f_{z(t)}(X'_2(t)))$$

and in which Z(t) is determined in such a way that the operations of inversion are transformed into operations of multiplication.

At step /1/, the value of the parameter t can be obtained as a function of a password or an identifier. It is thus possible to envisage using the password directly or a derivative of the password as parameter.

In one embodiment of the present invention, the cryptographic application is an application of authentication or identification by a checking entity, and at step /1/, the following steps are executed:
/a/ generate a random value;
/b/ obtain an encrypted value by encrypting said random value based on an encryption function using an encryption key determined from a password or identifier corresponding to the parameter; and
/c/ transmit the encrypted value to the checking entity.

By following this procedure, the checking entity is able to obtain the random value as a function of the encrypted value received from the password. Then it recovers the value of the parameter t by applying a suitable function.

A second aspect of the present invention proposes an electronic device comprising suitable means for applying a method of execution of a cryptographic calculation according to the first aspect of the present invention.

Other aspects, aims and advantages of the invention will become clear on reading the description of one of its embodiments.

BRIEF DESCRIPTION OF THE DRAWINGS

The invention will also be better understood with the aid of the following figures.

DETAILED DESCRIPTION OF THE DRAWINGS

Figure 1:
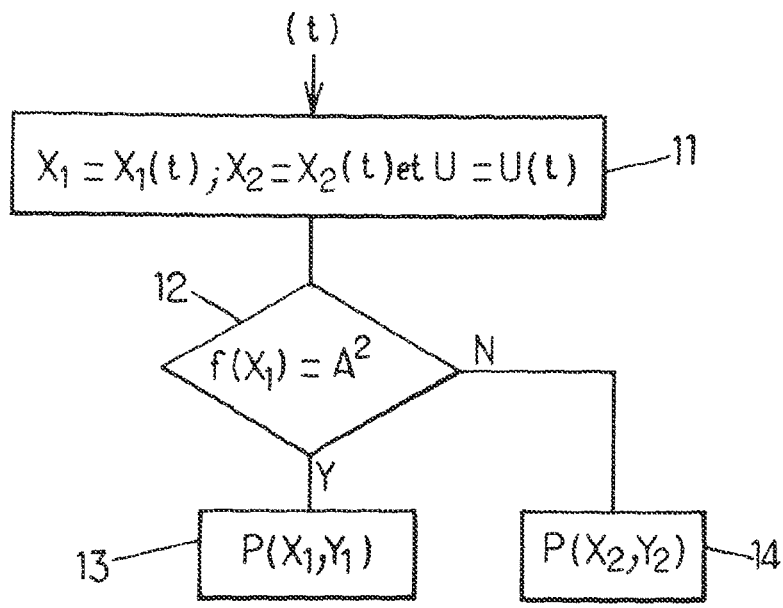
FIG. 1 show the main steps of a method of execution of a cryptographic calculation according to one embodiment of the present invention.

FIG. 1 shows the main steps of a method of execution of a calculation according to one embodiment of the present invention.

Figure 4:
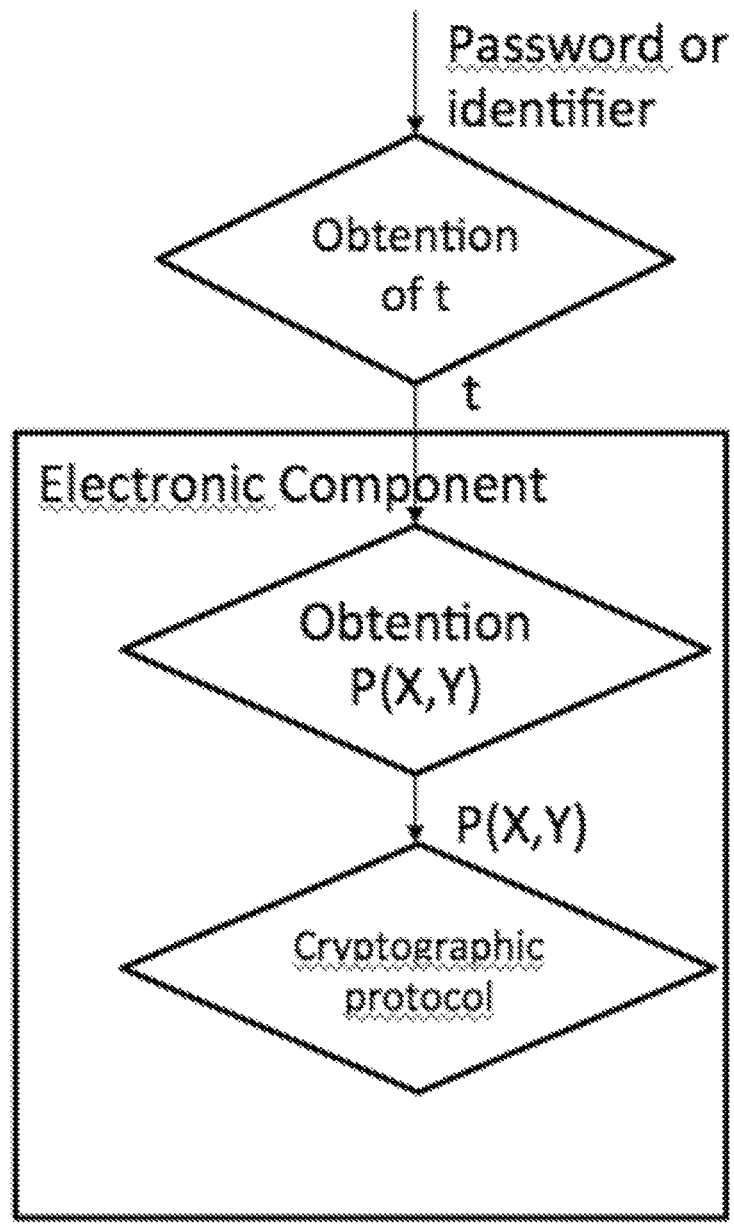
FIG. 4 shows the processing steps performed by an electronic component used to execute the cryptographic calculation according to one embodiment of the present invention.
Figure 5:
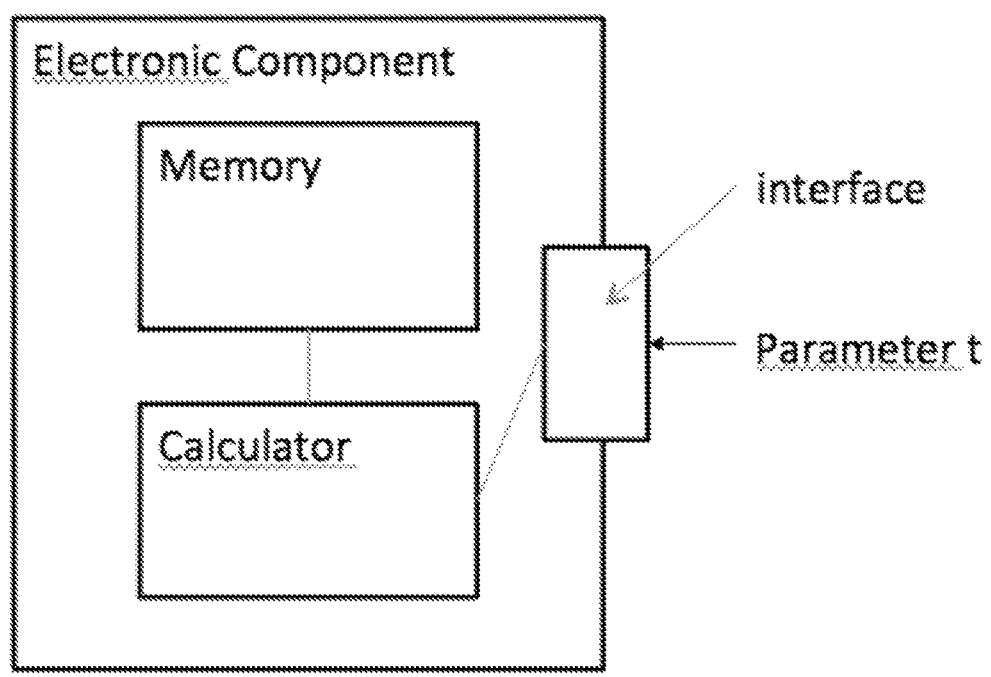
FIG. 5 is a block diagram showing the elements of an electronic component used to perform the processing shown in FIGS. 1-4.

These main steps are suitable for determining a point on an elliptical curve with the aim of using said point in a cryptographic application. A cryptographic calculation of this kind can be executed in an electronic component in a secure manner, i.e. without the determination of this point giving any information on the point determined and therefore on parameter t. FIGS. 4 and 5 provide further details regarding the processing performed by the electronic component (FIG. 4), and the elements used to implement the electronic component (FIG. 5).

This calculation comprises, in a finite field $F_q$, where q is equal to 3 mod 4, a step of obtaining a point P(X,Y) on an elliptical curve satisfying the equation:

$$Y^2 = f(X)$$

A point P(X,Y) has its abscissa X which corresponds to one of $X_1(t)$ and $X_2(t)$, for a value of t obtained, such that:

$$-f(X_1(t)) \cdot f(X_2(t)) = U^2 \qquad (4)$$

in the finite field $F_q$.

Such polynomials can be a function of two parameters u and t. In the context of the present invention, one of the parameters can advantageously be set and consequently the polynomials satisfying equation (4) are then functions of a single parameter t.

Generally, in order to determine a point on the curve, we try to determine, given input parameters u and t, those among the values $X_1 = X_1(t,u)$ and $X_2 = X_2(t,u)$ that correspond to a squared term in the finite field $F_q$. For this purpose, at a step 11, the parameter t is taken into account and we calculate:

$$X_i = X_i(t) \text{ for } i \text{ equal to 1 or 2,}$$

and $$U = U(t)$$

At a step 12, we decide whether the term $f(X_1)$ is a squared term on the basis of certain calculations. If the term $f(X_1)$ is a squared term then its square root is calculated in order to obtain, at step 13, the point P on abscissa $X_1$ and ordinate $Y_1$ obtained from the calculation of the previous square root.

In the opposite case, the point P on the abscissa $X_2$ and the ordinate $Y_2$ are obtained at step 14. To this end we envisage calculating the square root of the term $f(X_2)$.

It should be noted that reaching steps 13 or 14 for obtaining a point on the elliptical curve according to one embodiment of the present invention requires similar operations. Thus, regardless of the input parameter or parameters t and u, it is not possible to launch an attack on the basis of the time elapsed.

The point $P(X_i, Y_i)$, for an i equal to 1 or 2, can then be used advantageously in a cryptographic application of encryption or hashing or signature or authentication or identification, since its determination has not supplied any element that can break its secret.

In the field $F_q$, q corresponding to 3 mod 4, it is possible to check whether a term is a squared term in various ways.

Figure 2:
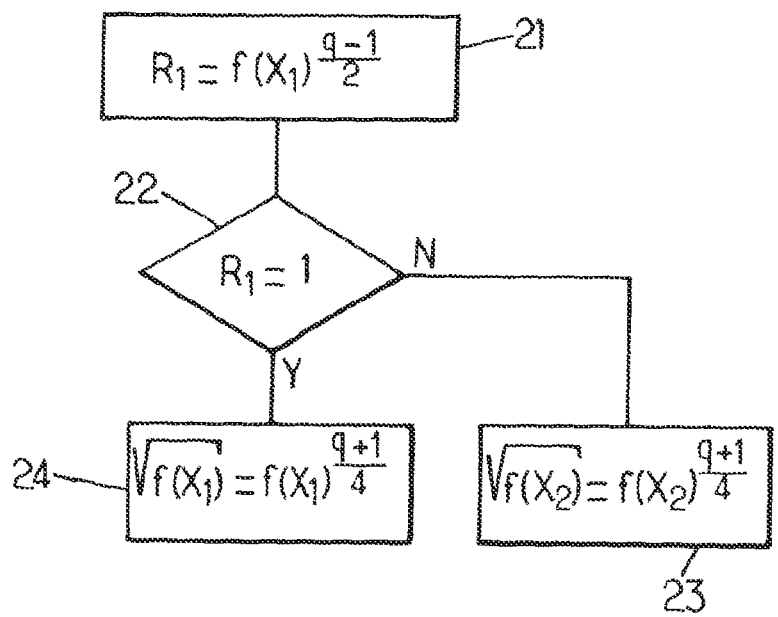
FIG. 2 shows a method of execution of a cryptographic calculation in detail according to one embodiment of the present invention.

FIG. 2 illustrates the application of the method according to an embodiment of the present invention.

At step 21, we calculate:

$$R_1 = f(X_1)^{\frac{q-1}{2}}$$

Then, the test for checking whether the term $f(X_1)$ is a squared term in $F_q$, can be carried out, at a step 22, by comparing $R_1$ to 1. In fact, in $F_q$, if $R_1$ is equal to 1, then $f(X_1)$ is a squared term. In this case, at step 24, the square root of this term is calculated as follows:

$$\sqrt{f(X_1)} = f(X_1)^{\frac{q+1}{4}}$$

Otherwise, the term $f(X_2)$ is a squared term. Then, at a step 23, its square root is calculated as follows:

$$\sqrt{f(X_2)} = f(X_2)^{\frac{q+1}{4}}$$

In this embodiment, it should be noted that the number and the type of operations carried out for the determination of a point P is the same whatever the processing option taken, i.e. whatever the term which corresponds to a squared term in equation (4).

Figure 3:
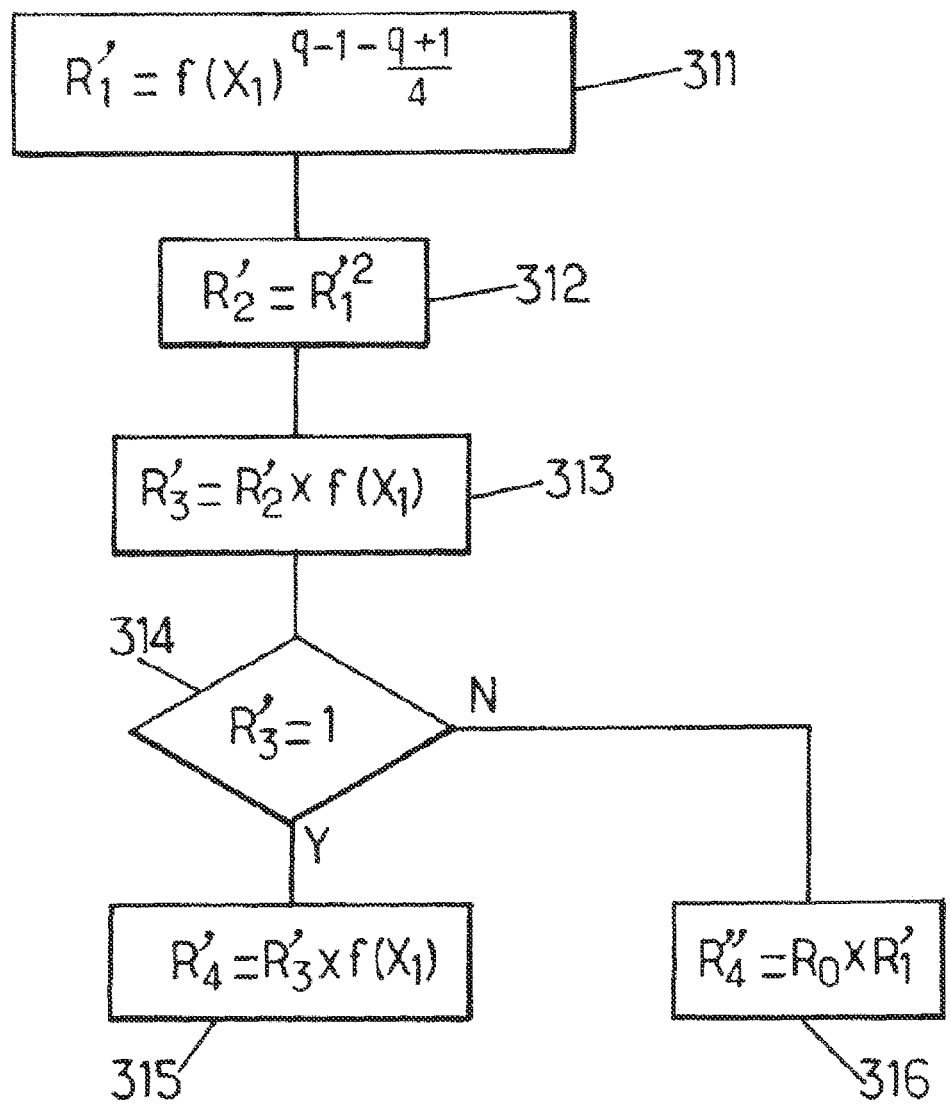
FIG. 3 shows a method of execution of a cryptographic calculation in detail according to one embodiment of the present invention.

FIG. 3 illustrates another embodiment of an execution method according to one embodiment of the present invention in which only one exponentiation is applied.

Here, advantageously, the number of exponentiations can be further reduced, by not using the same test for a squared term 12 of FIG. 1.

In one embodiment of the present invention, when trying to determine whether a term A is a squared term in $F_q$, the following steps can be executed:

$$W_1 = \frac{1}{A^{\frac{q+1}{4}}} = A^{q-1-\frac{q+1}{4}} \qquad (i)$$

$$W_2 = W_1^2 \qquad (ii)$$

$$W_3 = W_2 \cdot A \qquad (iii)$$

Finally, if term A is a squared term then:
W1 corresponds to the reciprocal of the square root of A, i.e. $1/\sqrt{A}$, since an exponentiation at (q−1) corresponds to an inversion and an exponentiation at (q+1)/4 corresponds to a square root in the finite field $F_q$;
$W_2$ corresponds to the inverse of A;
and $W_3$ corresponds to the value 1.

Thus, when $W_3$ is equal to the value 1, it is concluded from this that the term A is a squared term in the finite field $F_q$. If A is not a squared term then $W_3$ is not equal to 1.

The following sections describe an embodiment based on this type of test. In one embodiment of the present invention, at a step 311, the following multiplication is performed:

$$R'_1 = f(X_1)^{q-1-\frac{q+1}{4}}$$

Then it is checked whether this term Ro is a squared term as stated previously. Thus in a step 312, we calculate $$R'_2 = R'^2_1$$

Then in a step 313, we calculate $$R'_3 = R'_2 \cdot f(X_1)$$

Then, we decide whether the term $R'_3$ is equal to 1 at step 314. If this is the case, then the following term corresponds to the square root of the term $f(X_1)$:

$$R'_4 = R'_3 \cdot f(X_1)$$

If the test 314 is not satisfied, then the term $f(X_2)$ is a square root in $F_q$. The square root of this term is thus obtained at step 316 according to the following equation:

$$R''_4 = R_0 \cdot R'_1$$

where $R_0$ satisfies the following equation $$R_0 = U(t) \cdot (-1)^{q-1-\frac{q+1}{4}}$$

It should be noted that the above equation makes it possible to obtain advantageously the square root of $f(X_2)$ but without carrying out an operation of exponentiation such as that carried out at step 23 or also at step 311. In fact, here it is, ingeniously, a matter of performing a multiplication instead of an exponentiation.

We then obtain R4", which corresponds to the term $f(X_2)$. Thus, a point P on the elliptical curve has been determined which has $X_2$ as abscissa and R4" as ordinate.

In the embodiment described previously with reference to FIG. 3, like that described with reference to FIG. 2, regardless of the determination of point P, i.e. whether this determination is based on the value $X_1$ or $X_2$, similar calculations are employed, thus ensuring determination of a point on the elliptical curve in a constant time.

In one embodiment of the present invention, it is possible to select polynomials that satisfy equation (4) according to one embodiment of the present invention, by basing it on Ulas polynomials as defined in the document "Rational points on certain hyperelliptic curves over finite fields" by Macie Ulas, dated 11 Jun. 2007.

In this document, the polynomials satisfying Skalba's equation (2) are described:

$$X_1(t, u) = -\frac{b}{a}\left(1 + \frac{1}{t^4 f(u) + t^2 f(u)}\right)$$

$$X_2(t, u) = t^2 f(u) X_1(t, u)$$

$$U(t, u) = t^3 f(u)^4 f(X_1(t, u))$$

where $f(u) = u3 + au + b$ where a and b are elements of Fq such that their product is not zero. Thus, the equations can be rewritten by setting $$f(u) = -1$$

without it being necessary to calculate a value of parameter u for which this last equation is satisfied. We then obtain $$X_1(t) = -\frac{b}{a}\left(1 + \frac{1}{t^4 - t^2}\right)$$

$$X_2(t) = -t^2 X_1(t),$$

and $$U(t) = t^3 f(X_1(t))$$

Advantageously, these polynomials satisfy the following equation:

$$-f(X_1(t)) \cdot f(X_2(t)) = U(t)^2$$

In one embodiment of the present invention, the use of Jacobian coordinates is advantageously envisaged. This transformation into Jacobian coordinates makes it possible to transform the operations of inversion into operations of multiplication which are quicker and easier to apply.

The equation of an elliptical curve:

$$X^3 + aX + b + Y^2$$

can be written in Jacobian coordinates:

$$X^3 + aX'Z^4 + bZ^6 = Y'^2$$

It should be noted that the coordinates of a point (X,Y) can be written in Jacobian coordinates (X',Y',Z') such that:

$$X' = X \cdot Z^2 \text{ and}$$

$$Y' = Y \cdot Z^3$$

We should therefore determine a polynomial Z(t,u) in such a way that the Jacobian coordinates X', Y' and Z can be written without inversion.

In the following sections, this transformation into Jacobian coordinates is applied to a particular case of polynomials as stated previously.

In this context, any operation of inversion is eliminated by taking:

$$Z(t) = a(t^4 - t^2)$$

In fact, the polynomials can then be written in the following form in Jacobian coordinates:

$$X'_1(t) = -b \cdot Z(t)(t^4 - t^2 + 1)$$

$$X'_2(t) = -t^2 \cdot X'_2(t)$$

It should therefore be noted that there is no longer any inversion in Jacobian coordinates. As this operation can be as costly as an exponentiation, these coordinates permit a significant improvement in calculation time.

Then, to obtain the Jacobian coordinate Y', it is advisable to calculate U'(t,u), the equivalent of U(t,u) in Jacobian coordinates.

We can then write in Jacobian coordinates:

$$U'(t) = t^3 \cdot fz(X_2'(t))$$

with:

$$fz(t)(X') = X'^3 + a \cdot X' \cdot Z(t)^4 + b \cdot Z(t)^6$$

By way of example only, the equations below make it possible to no longer have to carry out inversion operations. Under these conditions an execution method is then obtained which is more efficient and quick, while ensuring an execution still in a constant time.

The electronic component used to perform a disclosed cryptographic calculation may be any type of general purpose or dedicated computer which has been programed to receive the necessary inputs, perform the desired calculations, and provide the resulting output. By way of example, such a computer could be in the nature of a controller, micro-controller, field programmable gate array (FPGA), or application specific integrated circuit (ASIC).

The processing performed by such electronic computer includes obtention 411 of a password identifier t which is provided as an input to obtain a point P(X,Y) 413 which is then used to perform a cryptographic calculation using one of the above-described cryptographic protocols according to one of the disclosed embodiments of an execution method according to the present invention.

FIG. 5 discloses an electronic component of the type which may be utilized in the present invention. The electronic component includes a memory 513, a calculator 515 and an interface 517. It is much as such memory, calculator and interface are well known components of the type implemented in known channel purpose or dedicated computers, no further details are necessary in order for a person having ordinary skill in the art to implement such electronic component.

The present invention can advantageously be implemented in any type of cryptographic calculation using elliptical curves. It can in particular be advantageous in protocols for authentication by password, such as PACE (Password Authenticated Connection Establishment). In this case, it allows an improvement in calculation performance, while not allowing any attack linked to the execution time of the cryptographic calculation.

The present invention can also be applied advantageously in the context of privacy protocols, such as those used for checking electronic identity documents, such as electronic passports.

What is claimed is:

1. An electronic component configured to execute a cryptographic calculation and obtain a point P(X,Y) from at least one parameter t, on an elliptical curve that satisfies the equation: $Y^2 = f(X)$ and from polynomials $X_1(t)$, $X_2(t)$, and $U(t)$ satisfying the following equality: $-f(X_1(t)) \cdot f(X_2(t)) = U$ $(t)^2$ in a finite field $F_q$, regardless of the parameter t, q satisfying the equation q=3 mod 4, said electronic component configured to:

obtain a value of the parameter t;

determine the point P by:

(i) calculating $X_1=X_1(t)$, $X_2=X_2(t)$ and $U=U(t)$;

(ii) testing whether the term $f(X_1)$ is a squared term in the finite field $F_q$ and in this case calculating the square root of the term $f(X_1)$, the point P having $X_1$ as abscissa and the square root of the term $f(X_1)$ as ordinate $Y_1$;

(iii) otherwise calculating the square root of the term $f(X_2)$, the point P having $X_2$ as abscissa and the square root of the term $f(X_2)$ as ordinate Y2; and wherein said electronic component is further configured to use said point P in a cryptographic application selected from the group consisting of encryption or hashing or signature or authentication or identification to generate at least one of a secret key, a secret signature and an encrypted message for a user of a device, wherein the cryptographic calculation is an application of authentication or identification by a checking entity, and wherein said electronic component in obtaining the value of the parameter t is further configured to:

/a/ generate a random value;

/b/ obtain an encrypted value by encrypting said random value based on an encryption function using an encryption key determined from a password or identifier corresponding to the parameter; and /c/ transmit the encrypted value to the checking entity.

2. The electronic component according to claim 1, wherein in order to determine the point P said electronic component is further configured to:

calculate $R_1$ such that $$R_1 = f(X_1)^{\frac{q-1}{2}}$$

if the calculated $R_1$ is equal to 1, decide that the term $f(X_1)$ is a squared term in the finite field $F_q$; and otherwise, calculate the ordinate $$Y_2 = f(X_2)^{\frac{q+1}{4}}.$$

3. The electronic component according to claim 1, wherein in order to determine the point P said electronic component is further configured to:

calculate $R'_1$ such that:

$$R'_1 = f(X_1)^{q-1-\frac{q+1}{4}};$$

calculate $R'_2$ such that:

$R'_2 = R'_1{}^2$; and calculate $R'_3$ such that:

$R'_3 = R'_2 \cdot f(X_1)$ if $R'_3$ is not equal to 1, then obtain the square root of the term $f(X_2)$ according to the following equation:

$\sqrt{f(X_2)} = R_0 \cdot R'_1$ where $R_0$ satisfies the following equation:

$$R_0 = U(t) \cdot (-1)^{q-1-\frac{q+1}{4}}.$$

4. The electronic component according to claim 3, further configured to determine the point P by obtaining the square root of the term $f(X_1)$ according to the following equation:

$\sqrt{f(X_1)} = R'_3 \cdot f(X_1)$ if $R'_3$ is equal to 1.

5. The electronic component according to claim 1, wherein the polynomials are expressed in Jacobian coordinates according to which the point P(X,Y) is written P(X', Y',Z) such that:

$X' = X \cdot Z^2$; and $Y' = Y \cdot Z^3$ where the function is written $f_Z(X')$ and satisfies:

$f_Z(x') = X'^3 + a \cdot x' \cdot Z^4 + b \cdot Z^6$ with the elliptical curve satisfying the equation:

$Y'^2 = f_Z(X')$ in which the polynomials expressed in Jacobian coordinates are $X'_1(t)$, $X'_2(t)$, $Z(t)$ and $U'(t)$ and satisfy the equality in Jacobian coordinates:

$U'(t)^2 = -f_Z(t)(X'_1(t)) \cdot f_Z(t)(X'_2(t))$ and in which Z(t) is determined in such a way that operations of inversion are transformed into operations of multiplication.

6. The electronic component according to claim 1, wherein in obtaining the value of the parameter t said electronic component is further configured to obtain the value of the parameter t as a function of a password or an identifier.

* * * * *